US012780003B2

(12) United States Patent
Yasuda et al.

(10) Patent No.: US 12,780,003 B2
(45) Date of Patent: Nov. 3, 2026

(54) CONTROL SYSTEM OF ELECTRIFIED VEHICLE FOR EXECUTING LIMP HOME MODE

(71) Applicants: TOYOTA JIDOSHA KABUSHIKI KAISHA, Toyota (JP); DENSO CORPORATION, Kariya-city (JP)

(72) Inventors: Satoshi Yasuda, Nagakute (JP); Taro Shimosaka, Seto (JP)

(73) Assignees: TOYOTA JIDOSHA KABUSHIKI KAISHA, Toyota (JP); DENSO CORPORATION, Kariya-City (JP)

(*) Notice: Subject to any disclaimer, the term of this patent is extended or adjusted under 35 U.S.C. 154(b) by 21 days.

(21) Appl. No.: 18/971,481

(22) Filed: Dec. 6, 2024

(65) Prior Publication Data

US 2025/0222774 A1 Jul. 10, 2025

(30) Foreign Application Priority Data

Jan. 9, 2024 (JP) ................................ 2024-001252

(51) Int. Cl.
*B60L 3/00* (2019.01)
*B60L 15/20* (2006.01)
*H02P 29/028* (2016.01)

(52) U.S. Cl.
CPC ................ *B60L 3/00* (2013.01); *B60L 15/20* (2013.01); *H02P 29/028* (2013.01); *B60L 2260/26* (2013.01)

(58) Field of Classification Search
CPC ........ B60L 3/00; B60L 15/20; B60L 2260/26; B60L 3/0061; B60L 3/0084; B60L 3/0092; H02P 29/028
See application file for complete search history.

(56) References Cited

U.S. PATENT DOCUMENTS

| | | | | |
|---|---|---|---|---|
| 2022/0055612 | A1* | 2/2022 | Kim | B60W 20/50 |
| 2023/0141235 | A1 | 5/2023 | Okamoto et al. | |

FOREIGN PATENT DOCUMENTS

| | | | | |
|---|---|---|---|---|
| JP | 2020062930 | * | 4/2020 | Y02T 10/62 |
| JP | 2022-144850 | A | 10/2022 | |
| JP | 2023-069096 | A | 5/2023 | |
| JP | 2023-069457 | A | 5/2023 | |

* cited by examiner

*Primary Examiner* — Brodie J Follman
(74) *Attorney, Agent, or Firm* — Sughrue Mion, PLLC

(57) ABSTRACT

A control system includes a first control device, a processor, and a logic circuit. When a failure in the processor is detected, the first control device determines whether it is possible to perform a limp home mode, and when it is determined that it is possible to perform the limp home mode, outputs, to the logic circuit, a mode shift request for causing the logic circuit to shift to the limp home mode. The logic circuit is configured to be able to determine, based on the monitoring, whether a situation requires that the limp home mode be performed when the mode shift request is acquired from the first control device, and shifts to the limp home mode when the mode shift request is acquired from the first control device and also it is determined that a situation requires that the limp home mode be performed.

7 Claims, 3 Drawing Sheets

CONTROL SYSTEM OF ELECTRIFIED VEHICLE FOR EXECUTING LIMP HOME MODE

CROSS-REFERENCE TO RELATED APPLICATION

This application claims priority to Japanese Patent Application No. 2024-001252 filed on Jan. 9, 2024, incorporated herein by reference in its entirety.

BACKGROUND

1. Technical Field

A technology disclosed by the present description relates to a control system for an electrified vehicle.

2. Description of Related Art

Japanese Unexamined Patent Application Publication No. 2023-069457 describes a control device for a motor, which includes a microcomputer and an ASIC. The ASIC stores a program for causing an electrified vehicle to limp home when a failure in the microcomputer is detected.

SUMMARY

A conceivable configuration is that a high-order ECU and an ASIC are configured to be able to communicate with each other, and a request to shift to a limp home mode is output from the high-order ECU to the ASIC when the high-order ECU detects a failure in a microcomputer. In such a configuration, although a shift to the limp home mode can be made properly, there is a possibility that a shift to the limp home mode is unnecessarily made when a malfunction occurs in the high-order ECU. The present description provides a technology for properly shifting to the limp home mode.

The present description discloses a control system for an electrified vehicle. In a first aspect, the control system includes: an electricity control device that adjusts electricity to be supplied to a motor of the electrified vehicle; a first control device that outputs a first command value indicating a target output of the motor; and a second control device that is configured to be able to communicate with the first control device and that outputs a drive signal to the electricity control device based on the first command value output from the first control device. The second control device includes: a processor that is configured to be able to communicate with the first control device and that processes, through a program, the first command value output from the first control device and outputs an operation command value for the motor; and a logic circuit that monitors whether or not the processor has failed and that has a circuit structure that transforms the operation command value output from the processor into the drive signal. The logic circuit is further configured to be able to communicate with the first control device not via the processor. The first control device, when a failure in the processor is detected, determines whether or not it is possible to perform a limp home mode in which the electrified vehicle is caused to limp home and, when it is determined that it is possible to perform the limp home mode, outputs, to the logic circuit, a mode shift request for causing the logic circuit to shift to the limp home mode. The logic circuit is configured to be able to determine, based on the monitoring, whether or not a situation requires that the limp home mode be performed when the mode shift request is acquired from the first control device, and shifts to the limp home mode when the mode shift request is acquired from the first control device and also it is determined that a situation requires that the limp home mode be performed.

According to such a configuration, when a failure in the processor is detected, the first control device outputs, to the logic circuit, a mode shift request for causing the logic circuit to shift to the limp home mode. The logic circuit is configured to be able to determine whether or not a situation requires that the limp home mode be performed. When the mode shift request is received from the first control device and also it is determined that a situation requires that the limp home mode be performed, the logic circuit shifts to the limp home mode. In such a manner, the logic circuit can shift to the limp home mode in a situation requiring that the limp home mode be performed. In other words, a shift to the limp home mode is made properly.

A second aspect is that in the first aspect, the logic circuit may be further configured to output, to the first control device, a state indicator indicating a state of the electricity control device while monitoring the state indicator, and when a failure in the processor is detected, the first control device may determine, based on the state indicator output from the logic circuit, whether or not it is possible to perform the limp home mode. According to such a configuration, the electrified vehicle can be caused to limp home properly.

A third aspect is that in the first or second aspect, when the logic circuit shifts to the limp home mode, the logic circuit may output, to the first control device, a signal indicating that the logic circuit has shifted to the limp home mode, and when the signal is acquired, the first control device may output, to the logic circuit, a second command value based on the limp home mode instead of the first command value. According to such a configuration, when the logic circuit has shifted to the limp home mode, the electrified vehicle can be caused to limp home based on the second command value.

A fourth aspect is that in any one of the first to third aspects, when the mode shift request is acquired from the first control device and also it is determined that a situation does not require that the limp home mode be performed, the logic circuit does not need to shift to the limp home mode. According to such a configuration, for example, in a situation where the limp home mode actually should not be performed although a mode shift request is output to the logic circuit due to malfunction of the first control device, the electrified vehicle can be caused to, for example, travel normally without being caused to limp home.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
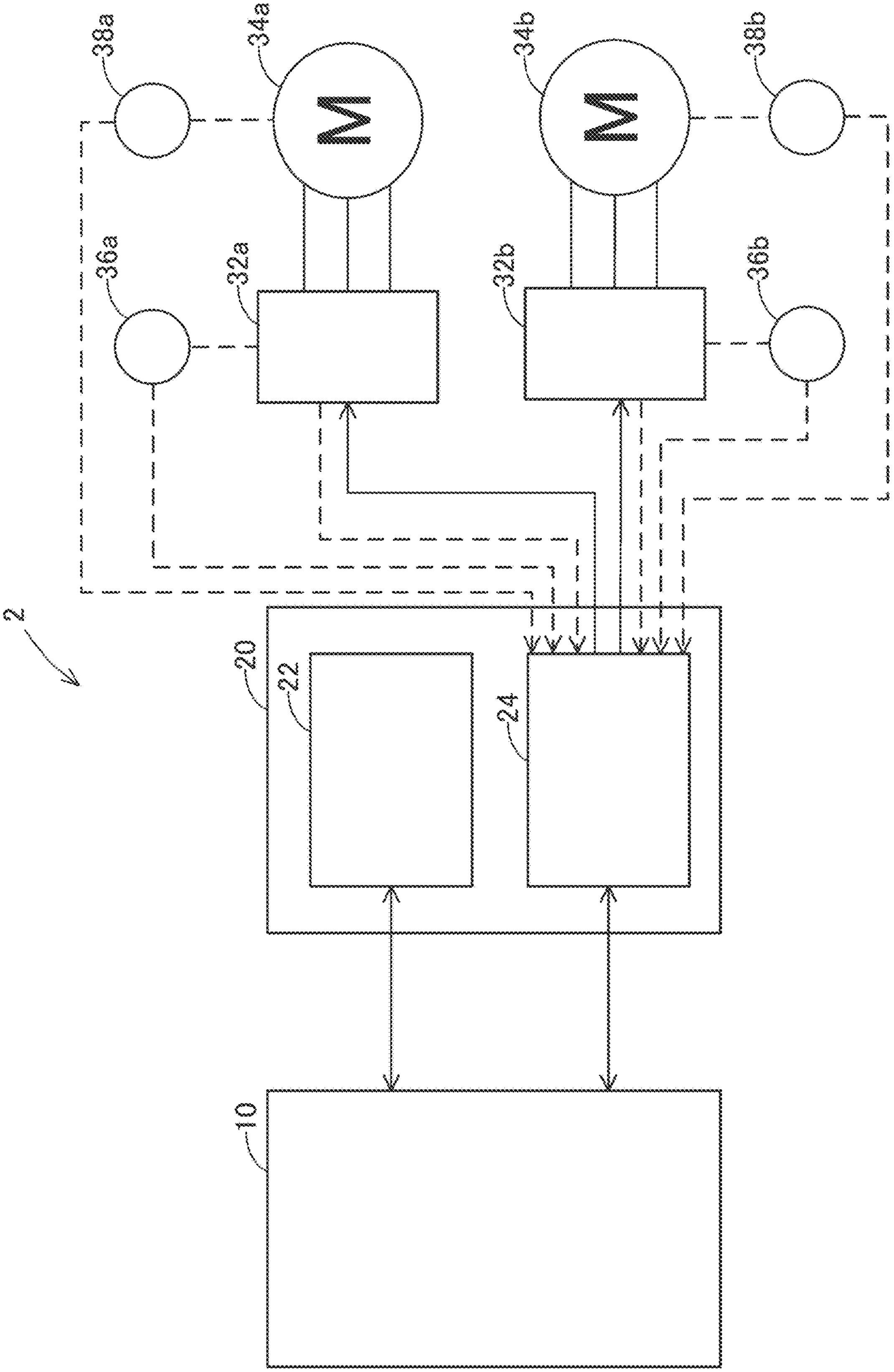
FIG. 1 shows a circuit configuration of a control system.

Circuit Configuration of Control System 2; FIG. 1

A control system 2 in the present embodiment is mounted on an electrified vehicle (for example, a battery electric vehicle, a hybrid electric vehicle, a plug-in hybrid electric vehicle, a fuel cell electric vehicle, or the like) including a motor for traveling that drives wheels. As shown in FIG. 1, the control system 2 includes a high-order electronic control unit (ECU) 10, a motor ECU 20, two inverters 32*a*, 32*b*, and two motors 34*a*, 34*b* for traveling.

The high-order ECU 10 outputs torque command values indicating respective target outputs of the motors 34*a*, 34*b*, based on, for example, an accelerator operation amount or the like. The motor ECU 20 is configured to be able to communicate with the high-order ECU 10. The motor ECU 20 outputs drive signals to the inverters 32*a*, 32*b*, based on the torque command values output from the high-order ECU 10.

The motor ECU 20 includes a microcomputer 22 and an application specific integrated circuit (ASIC) 24. The microcomputer 22 is configured to be able to communicate with the high-order ECU 10. The microcomputer 22 processes the torque command values output from the high-order ECU 10 through a program and outputs current command values for the motors 34*a*, 34*b*. The microcomputer 22 includes, for example, a central processing unit (CPU), and the torque command values output from the high-order ECU 10 can be processed by the CPU through a program.

The ASIC 24 has a circuit structure that transforms the current command values output from the microcomputer 22 into drive signals. The circuit structure of the ASIC 24, in particular, is a circuit structure for controlling the motors 34*a*, 34*b*. For example, such a circuit structure includes part, or the entire, of a hardware portion specialized in motor control, such as a resolver digital converter, an analog-digital converter, or a motor IP. Although a depiction is omitted, the microcomputer 22 and the ASIC 24 are configured to be able to communicate with each other.

The inverters 32*a*, 32*b* convert direct-current electricity output from an undepicted battery into three-phase alternating-current electricity and supply the three-phase alternating-current electricity to the motors 34*a*, 34*b*, respectively. In other words, the individual inverters 32*a*, 32*b* are devices that adjust electricity to be supplied to the motors 34*a*, 34*b*, respectively. The electrified vehicle can travel by the motors 34*a*, 34*b* being driven. Note that the inverters 32*a*, 32*b* also can convert electricity (three-phase alternating-current electricity) regenerated by the individual motors 34*a*, 34*b* into direct-current electricity and supply the direct-current electricity to the undepicted battery. Since the specific circuit configuration of the inverters 32*a*, 32*b* is well known, a detailed description thereof is omitted.

Current sensors 36*a*, 36*b* are connected to the inverters 32*a*, 32*b*, respectively. The current sensors 36*a*, 36*b* are sensors that detect the current values of output currents of the inverters 32*a*, 32*b* (that is, currents to be supplied to the individual motors 34*a*, 34*b*), respectively. The current values detected by the individual current sensors 36*a*, 36*b* are output to the ASIC 24.

Angle sensors 38*a*, 38*b* are connected to the motors 34*a*, 34*b*, respectively. The angle sensors 38*a*, 38*b* are, for example, resolvers. The angle sensors 38*a*, 38*b* detect angles of rotation of the motors 34*a*, 34*b* (specifically, rotors), respectively. The angles of rotation detected by the individual angle sensors 38*a*, 38*b* are input into the ASIC 24.

The ASIC 24 is further configured to be able to communicate with the high-order ECU 10 not via the microcomputer 22. The ASIC 24 is configured to output state indicators repeatedly (for example, each time a predetermined time period elapses). The state indicators indicate the respective states of the inverters 32*a*, 32*b*, such as current values detected by the current sensors 36*a*, 36*b*. Apart from the current values, the state indicators include the respective temperatures of the inverters 32*a*, 32*b*, the power supply states of respective control substrates of the inverters 32*a*, 32*b*, and the like. In the present embodiment, the state indicators are used by the high-order ECU 10 in determination of whether or not it is possible to perform a limp home mode, which will be described later.

The ASIC 24 is further configured to monitor whether or not the microcomputer 22 has failed. For example, the ASIC 24 may transmit a signal to the microcomputer 22 in each predetermined period and, when a response to the signal is not received, may determine that the microcomputer 22 has failed. A result of the monitoring is used to determine whether or not a situation requires that the limp home mode be performed when a request to shift to the limp home mode is received from the high-order ECU 10. Note that the ASIC 24 may be configured to output, to the high-order ECU 10, failure information indicating a failure in the microcomputer 22 when the microcomputer 22 has failed.

The high-order ECU 10 is also configured to be able to detect that the microcomputer 22 has failed. For example, the high-order ECU 10 may transmit a signal to the microcomputer 22 in each predetermined period and, when a response to the signal is not received, may detect that the microcomputer 22 has failed. In another example, when failure information is acquired from the ASIC 24, the high-order ECU 10 may detect that the microcomputer 22 has failed. In still another example, when failure information is acquired from the ASIC 24, the high-order ECU 10 may transmit a signal to the microcomputer 22 and, when a response to the signal is not received, may detect that the microcomputer 22 has failed.

As described above, in the control system 2 in the present embodiment, the high-order ECU 10 and the motor ECU 20 (that is, the microcomputer 22 and the ASIC 24) control the inverters 32*a*, 32*b* and the like while cooperating with each other. Specifically, first, the high-order ECU 10 outputs, to the microcomputer 22, torque command values that are target outputs of the motors 34*a*, 34*b* based on an accelerator operation amount or the like. The microcomputer 22 processes the torque command values through a program and outputs, to the ASIC 24, current command values for the motors 34*a*, 34*b*. The ASIC 24 transforms the current command values into drive signals.

In such a control system 2, a situation is assumed in which a failure occurs in one or some components (specifically, the microcomputer 22) of the motor ECU 20. In such a situation, the torque command values output from the high-order ECU 10 are not acquired by the microcomputer 22. Accordingly, the ASIC 24 cannot acquire the current command values from the microcomputer 22 and therefore cannot output the drive signals. In other words, generally, when the microcomputer 22 fails in such a control system 2, the control system 2 cannot cause the electrified vehicle to travel.

Accordingly, in the control system 2 in the present embodiment, when a failure in the microcomputer 22 is detected, the high-order ECU 10 determines, based on a state indicator output from the ASIC 24, whether or not it is possible to perform the limp home mode of causing the electrified vehicle to limp home. When it is determined that it is possible to perform the limp home mode, the high-order ECU 10 outputs a request to shift to the limp home mode to the ASIC 24. When the request to shift to the limp home mode is acquired from the high-order ECU 10 and also it is determined, based on the monitoring, that the microcomputer 22 has failed, the ASIC 24 shifts to the limp home mode. After the ASIC 24 shifts to the limp home mode, the high-order ECU 10 outputs torque command values based on the limp home mode to the ASIC 24 instead of the microcomputer 22. The ASIC 24 has a control logic (that is, a circuit structure) for causing the electrified vehicle to limp home. In other words, the ASIC 24 also includes a circuit structure that transforms a torque command value output from the high-order ECU 10 into a drive signal. As a result, even if a failure in the microcomputer 22 is detected, the electrified vehicle can be caused to limp home. Detailed processes are described below with reference to FIGS. 2 and 3.

Figure 2:
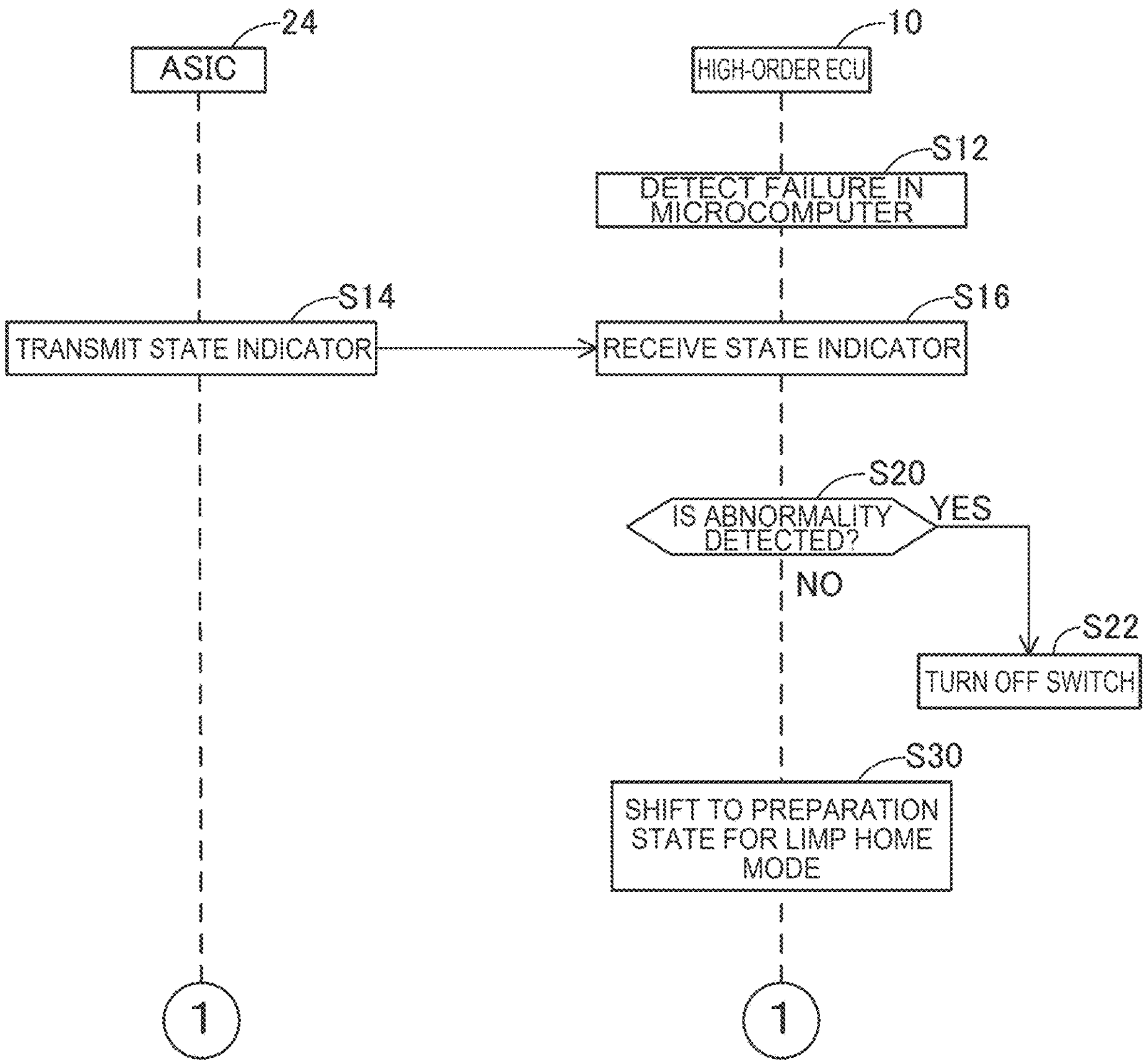
FIG. 2 shows a communication sequence chart between a high-order ECU and an ASIC of a motor ECU.
Figure 3:
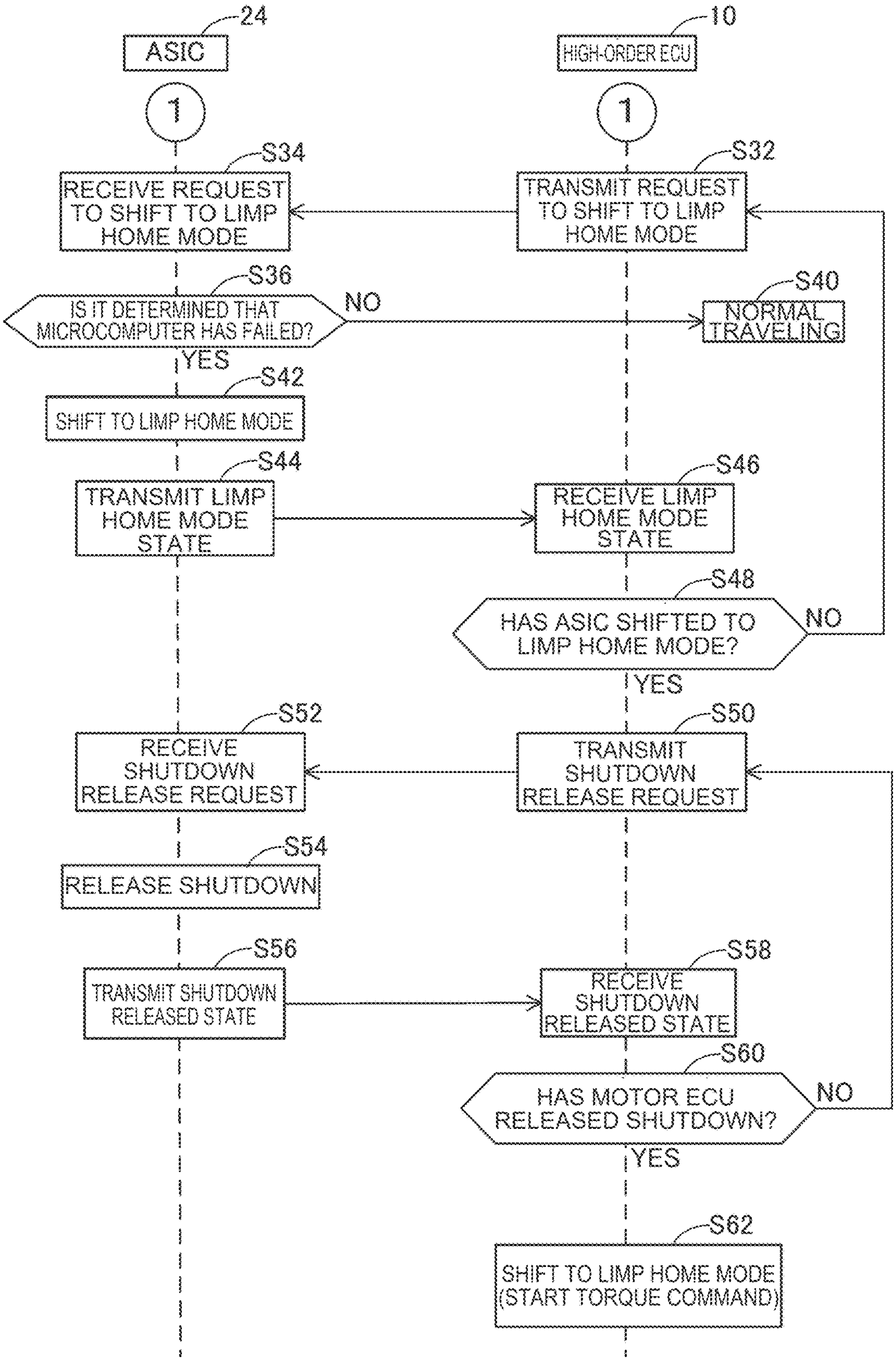
FIG. 3 shows a sequence chart continued from FIG. 2.

Detailed Processes; FIGS. 2 and 3

Subsequently, specific processes in the present embodiment are described with reference to FIGS. 2 and 3. In S12 in FIG. 2, the high-order ECU 10 detects a failure in the microcomputer 22. For example, the high-order ECU 10 detects a failure in the microcomputer 22, based on the fact that a response to a signal, which is transmitted to the microcomputer 22 in each predetermined period, is not received.

Although a depiction is omitted, the high-order ECU 10 transmits a shutdown request to the ASIC 24 when a failure in the microcomputer 22 is detected in S12. The reason is that since the microcomputer 22 has failed, the microcomputer 22 and the ASIC 24 cannot cooperate to control the motors 34*a*, 34*b*. When the shutdown request is received, the ASIC 24 shuts down a circuit for outputting drive signals to the inverters 32*a*, 32*b*.

As described above, the ASIC 24 is configured to output state indicators to the high-order ECU 10. In S14, the ASIC 24 transmits state indicators to the high-order ECU 10. Note that in a modification, the high-order ECU 10 may transmit, to the ASIC 24, a request to transmit state indicators when a failure in the microcomputer 22 is detected. Then in S14, the ASIC 24 may transmit state indicators to the high-order ECU 10 when the request to transmit state indicators is received from the high-order ECU 10. In addition to the state indicators, the ASIC 24 may transmit other information to the high-order ECU 10, for example, the temperature or the like of a constituent element, such as a transaxle or each motor, of the electrified vehicle.

When the state indicators are received from the ASIC 24 in S16, the high-order ECU 10 determines in S20, based on the state indicators (that is, current values, temperatures, power supply states of the inverters), whether or not an abnormality occurs in each inverter 32*a*, 32*b*. For example, when the temperature of at least one of the inverters 32*a*, 32*b* is higher than a threshold temperature, it is detected that an abnormality occurs in the inverter. When an abnormality is detected, the high-order ECU 10 determines that it is impossible to perform the limp home mode (YES in S20), moves to S22, and turns off a switch of the electrified vehicle. The reason is that in a situation where an abnormality is detected, it is not preferable to cause the electrified vehicle to travel. When an abnormality is not detected, the high-order ECU 10 determines that it is possible to perform the limp home mode (NO in S20) and moves to S30.

In S30, the high-order ECU 10 shifts to a preparation state for the limp home mode. The preparation state for the limp home mode is a mode in which various processes are executed with the ASIC 24 in order to shift the operation mode of the high-order ECU 10 from a normal travel mode to the limp home mode. The various processes executed with the ASIC 24 in order to shift to the limp home mode will be described later with reference to FIG. 3.

Continued from FIG. 2; FIG. 3

When the high-order ECU 10 shifts to the preparation state for the limp home mode in S30 in FIG. 2, the high-order ECU 10 transmits a request to shift to the limp home mode to the ASIC 24 in S32 in FIG. 3. The request to shift to the limp home mode is a signal for requesting that the ASIC 24 shift the state of the ASIC 24 to the limp home mode.

When the request to shift to the limp home mode is received from the high-order ECU 10 in S34, the ASIC 24 determines in S36 whether or not the microcomputer 22 has failed. As described above, the ASIC 24 monitors whether or not the microcomputer 22 has failed. The ASIC 24 moves to S42 when it is determined that the microcomputer 22 has failed (YES in S36), and moves to S40 when it is determined that the microcomputer 22 does not fail (NO in S36).

In S40, the high-order ECU 10 releases the preparation state for the limp home mode and performs normal traveling. This is because since the microcomputer 22 does not fail when the determination is NO in S36, the microcomputer 22 and the ASIC 24 can cooperate to cause the electrified vehicle to travel as normal.

A conceivable situation in which the determination is NO in S36 is, for example, malfunction of the high-order ECU 10. As described above, the high-order ECU 10 has detected a failure in the microcomputer 22 in S12 in FIG. 2. However, it is also conceivable that a failure in the microcomputer 22 is detected due to malfunction of the high-order ECU 10 although the microcomputer 22 actually does not fail. In such a case, the electrified vehicle can be caused to travel normally, by the processes in S36 and S40 being executed.

When the determination is YES in S36, the ASIC 24 shifts to the limp home mode in S42 and transmits in S44, to the high-order ECU 10, a limp home mode state indicating that the ASIC 24 has shifted to the limp home mode. The ASIC 24 is configured to transform torque command values output from the high-order ECU 10 to drive signals in the limp home mode. Output is restricted particularly in the limp home mode, compared to in normal times (that is, in a state where the microcomputer 22 does not fail).

After transmitting the request to shift to the limp home mode to the ASIC 24 in S32, the high-order ECU 10 determines in S48 whether or not the ASIC 24 has shifted to the limp home mode. Specifically, the high-order ECU 10 determines whether or not the limp home mode state has been received from the ASIC 24. When the limp home mode state has been received from the ASIC 24 (S46), the high-order ECU 10 determines that the ASIC 24 has shifted to the limp home mode (YES in S48) and moves to S50. When the limp home mode state has not been received from the ASIC 24, the high-order ECU 10 determines that the ASIC 24 has not shifted to the limp home mode (NO in S48) and executes the process in S32 again. The determination can be NO in S48 in cases, such as when the request to shift to the limp home mode is not appropriately transmitted from the high-order ECU 10 to the ASIC 24, or when there is a relatively long time lag between when the request to shift to the limp home mode is transmitted and when the limp home mode state is received.

In S50, the high-order ECU 10 transmits a shutdown release request to the ASIC 24. Although the high-order ECU 10 has transmitted a shutdown request to the ASIC 24 due to a failure in the microcomputer 22 as described above, the electrified vehicle can be caused to limp home in the limp home mode even if the microcomputer 22 has failed in the present case. Accordingly, in order to cause the electrified vehicle to limp home in the limp home mode, the high-order ECU 10 transmits a shutdown release request to the ASIC 24.

When the shutdown release request is received from the high-order ECU 10 in S52, the ASIC 24 releases the shutdown in S54. In other words, the ASIC 24 releases the shutdown of the circuit for outputting drive signals to the inverters 32*a*, 32*b*. Accordingly, the ASIC 24 falls in a state in which drive signals based on the limp home mode can be output to the inverters 32*a*, 32*b*.

In S56, the ASIC 24 transmits, to the high-order ECU 10, a shutdown released state indicating that the ASIC 24 has released the shutdown.

Moreover, after transmitting the shutdown release request to the ASIC 24 in S50, the high-order ECU 10 determines in S60 whether or not the ASIC 24 has released the shutdown. Specifically, the high-order ECU 10 determines whether or not the shutdown released state has been received from the ASIC 24. When the shutdown released state has been received from the ASIC 24 (S58), the high-order ECU 10 determines that the ASIC 24 has released the shutdown (YES in S60) and moves to S62. When the shutdown released state has not been received from the ASIC 24, the high-order ECU 10 determines that the ASIC 24 has not released the shutdown (NO in S60) and executes the process in S50 again. The determination can be NO in S60 in cases, such as when the shutdown release request is not appropriately transmitted from the high-order ECU 10 to the ASIC 24, or when there is a relatively long time lag between when the shutdown release request is transmitted and when the shutdown released state is received.

In S62, the high-order ECU 10 shifts to the limp home mode. In the limp home mode, an upper limit value of the torque command value is set low, compared to in the normal travel mode. When the high-order ECU 10 shifts to the limp home mode, the high-order ECU 10 outputs torque command values based on the limp home mode to the ASIC 24 instead of the microcomputer 22, based on the accelerator operation amount or the like. As a result, the ASIC 24 transforms the torque command values output from the high-order ECU 10 into drive signals and supplies the drive signals to the inverters 32*a*, 32*b*. As a result, the electrified vehicle can be caused to limp home in the limp home mode even in a situation where the microcomputer 22 of the motor ECU 20 has failed.

According to the configuration in the present embodiment, when a failure in the microcomputer 22 is detected (S12 in FIG. 2), the high-order ECU 10 outputs a request to shift to the limp home mode to the ASIC 24 (S32 in FIG. 3). The ASIC 24 is configured to monitor whether or not the microcomputer 22 has failed. When the mode shift request is received from the high-order ECU 10 and also it is determined that the microcomputer 22 has failed (YES in S36), the ASIC 24 shifts to the limp home mode (S42). In such a manner, the ASIC 24 can shift to the limp home mode in a situation where the microcomputer 22 has failed, that is, in a situation requiring that the limp home mode be performed. In other words, a shift to the limp home mode can be made properly.

The high-order ECU 10 and the motor ECU 20 are examples of "first control device" and "second control device" of the present technology, respectively. The microcomputer 22 and the ASIC 24 are examples of "processor" and "logic circuit" of the present technology, respectively. The inverters 32*a*, 32*b* are an example of "electricity control device" of the present technology. A torque command value output from the high-order ECU 10 to the microcomputer 22 and a torque command value output from the high-order ECU 10 to the ASIC 24 are examples of "first command value" and "second command value" of the present technology, respectively. A current command value output from the microcomputer 22 to the ASIC 24 is an example of "operation command value" of the present technology. A request to shift to the limp home mode is an example of "mode shift request" of the present technology.

Modifications of the present embodiment are described below. The processes in S44, S46, S56, S58 in FIG. 3 can be omitted. As described above, the ASIC 24 repeatedly outputs state indicators to the high-order ECU 10. Together with the state indicators, the ASIC 24 may transmit, to the high-order ECU 10, information (for example, an upper limit value of the output of the ASIC 24, or the like) with which the high-order ECU 10 can determine a state of the ASIC 24 (for example, the limp home mode state, the shutdown released state). The high-order ECU 10 may execute the processes in S48, S60, and the like based on such information.

In the control system 2 in the present embodiment, the high-order ECU 10 is configured to output torque command values to the motor ECU 20. The torque command values in the present embodiment are an example of the first command values that indicate target outputs of the motors 34*a*, 34*b*. However, in another embodiment, the high-order ECU 10 may output, to the motor ECU 20, indicators of another type that indicate target outputs of the motors 34*a*, 34*b* as the first command values, instead of the torque command values.

In the control system 2 in the present embodiment, the microcomputer 22 of the motor ECU 20 is programed to output current command values to the ASIC 24, based on the torque command values (or the first command values of another type). However, the current command values in the present embodiment are an example of the operation command values for the motors 34*a*, 34*b* and do not limit the operation command values. In another embodiment, the microcomputer 22 may be programed to determine operation command values of another type for the motors 34*a*, 34*b*, based on the torque command values (or the first command values of another type) and output the operation command values to the ASIC 24.

The processes in S14 to S22 in FIG. 2 can be omitted. In other words, the ASIC 24 does not need to output state indicators of the inverter 32*a* and the like to the high-order ECU 10. In such a case, the high-order ECU 10 may determine, based on indicators of a different type from the state indicators, whether or not it is possible to perform the limp home mode.

Although specific examples of the technology disclosed by the present description have been described, such examples are provided only for illustrative purposes and are not intended to limit the scope of claims. The technology described in claims includes various modifications and variations of the illustrated specific examples. Each of the technical elements described in the present description or the drawings demonstrates technical usefulness thereof on its own or in various combinations, and is not limited to the combinations described in claims at the time the application was filed. Moreover, the technology illustrated in the present description or the drawings can achieve a plurality of objects at the same time, and has technical usefulness by the fact per se that one of the objects is achieved.

What is claimed is:

1. A control system for an electrified vehicle, comprising:
- an inverter configured to adjust electricity to be supplied to a motor of the electrified vehicle;
- a first electronic control unit configured to output a first command value indicating a target output of the motor; and a second electronic control unit configured to be able to communicate with the first electronic control unit and further configured to output a drive signal to the inverter based on the first command value output from the first electronic control unit, wherein the second electronic control unit includes:

a processor configured to be able to communicate with the first electronic control unit, and further configured to acquire the first command value from the first electronic control unit, and process, through a program, the first command value and output an operation command value for the motor, and a logic circuit including a circuit structure configured to acquire the operation command value from the processor, transform the operation command value into the drive signal, and output the drive signal to the inverter, wherein the logic circuit is further configured to be able to communicate with the first electronic control unit not via the processor, wherein the first electronic control unit is further configured to:

detect whether or not the processor has failed based on a response signal not being received from the processor, based on detecting that the processor has failed, determine whether or not it is possible to perform a limp home mode in which the electrified vehicle is caused to limp home, and based on determining that it is possible to perform the limp home mode, output, to the logic circuit, a mode shift request for causing the logic circuit to shift to the limp home mode, and wherein the logic circuit is further configured to:

monitor whether or not the processor has failed, based on acquiring the mode shift request from the first electronic control unit, determine whether or not a situation requires the limp home mode to be performed based on the monitoring of whether the processor has failed, and based on acquiring the mode shift request from the first electronic control unit and determining that the situation requires the limp home mode to be performed, shift to the limp home mode.

2. The control system according to claim 1, wherein:

the logic circuit is further configured to output, to the first electronic control unit, a state indicator indicating a state of the inverter while monitoring the state indicator; and the first electronic control unit is further configured to, based on detecting that the processor has failed, determine whether or not it is possible to perform the limp home mode based on the state indicator output from the logic circuit.

3. The control system according to claim 1, wherein:

the logic circuit is further configured to, based on shifting to the limp home mode, output, to the first electronic control unit, a signal indicating that the logic circuit has shifted to the limp home mode; and the first electronic control unit is further configured to, based on acquiring the signal, output, to the logic circuit, a second command value based on the limp home mode.

4. The control system according to claim 1, wherein the logic circuit is further configured to, based on acquiring the mode shift request from the first electronic control unit and determining that the situation does not require the limp home mode to be performed, not shift to the limp home mode.

5. The control system of claim 1, wherein, among the first electronic control unit, the processor, and the logic circuit, only the logic circuit is configured to output the drive signal to the inverter, and wherein the inverter is further configured to adjust the electricity to be supplied to the motor of the electrified vehicle, based on the drive signal received from the logic circuit.

6. The control system of claim 1, wherein, among the first electronic control unit, the processor, and the logic circuit, first communication occurs directly between the processor and the first electronic control unit, second communication occurs directly between the processor and the logic circuit, and third communication occurs directly between the logic circuit and the first electronic control unit, wherein the first electronic control unit is further configured to detect, via the first communication, whether or not the processor has failed, wherein the logic circuit is further configured to monitor, via the second communication, whether or not the processor has failed, and wherein the logic circuit is further configured to be able to communicate, via the third communication, with the first electronic control unit not via the processor.

7. The control system of claim 6, wherein, among the first electronic control unit, the processor, and the logic circuit, only the logic circuit is configured to output the drive signal to the inverter, and wherein the inverter is further configured to adjust the electricity to be supplied to the motor of the electrified vehicle, based on the drive signal received from the logic circuit.

* * * * *